United States Patent [19]

Tokuno

[11] E Re. 31,138

[45] Reissued Feb. 1, 1983

[54] SINGLE FACER FOR MANUFACTURING SINGLE-FACED CORRUGATED BOARD

[75] Inventor: Masateru Tokuno, Nishinomiya, Japan

[73] Assignee: Rengo Co., Ltd., Osaka, Japan

[21] Appl. No.: 254,972

[22] Filed: Apr. 16, 1981

Related U.S. Patent Documents

Reissue of:

[64] Patent No.: 4,177,102
Issued: Dec. 4, 1979
Appl. No.: 926,853
Filed: Jul. 21, 1978

U.S. Applications:

[63] Continuation-in-part of Ser. No. 778,613, Mar. 17, 1977, abandoned.

[30] Foreign Application Priority Data

Apr. 19, 1976 [JP] Japan ..... 51-45136
Dec. 30, 1976 [JP] Japan ..... 51-158989

[51] Int. Cl.[3] ..... B31F 1/00

[52] U.S. Cl. ..... 156/473; 156/210; 156/285; 425/369; 425/388

[58] Field of Search ..... 156/470–473, 156/205–210, 462, 285; 425/388, 369–370; 162/357, 296–297, 368–372

[56] References Cited

U.S. PATENT DOCUMENTS

| | | | |
|---|---|---|---|
| 1,264,506 | 4/1918 | Hahn | 156/473 |
| 2,068,155 | 1/1937 | Swift | 156/473 |
| 2,480,316 | 8/1949 | Blair et al. | 156/205 |
| 2,975,033 | 3/1961 | Magnani | 162/369 X |
| 3,053,309 | 9/1962 | Wilson | 156/205 |
| 3,854,861 | 12/1974 | Worrall | 156/205 X |
| 3,947,206 | 3/1976 | DeLigt | 425/388 |
| 3,954,368 | 5/1976 | Kawakami | 425/388 X |

FOREIGN PATENT DOCUMENTS

| | | | |
|---|---|---|---|
| 906796 | 8/1972 | Canada | 162/372 |

*Primary Examiner*—David A. Simmons
*Attorney, Agent, or Firm*—Harding, Earley, Follmer & Frailey

[57] ABSTRACT

A single facer for manufacturing single-faced corrugated board having a first corrugating roll and a second corrugating roll meshing with the first corrugating roll to form a nip for receiving a sheet medium to corrugate the same, the second corrugating roll being provided with radial conduits extending toward its periphery through which suction is applied for attracting and holding the corrugated medium onto the peripheral surface thereof. The outer ends of the conduits terminate in the bottoms of axially spaced circumferential grooves formed around the periphery of the second corrugating roll. Finger-like plates engage within the circumferential grooves to seal at least some of the conduits disposed in the portion of the second corrugating roll which is not lapped by the corrugated medium. The apparatus further includes an applicator for applying adhesive to the peaks of the flutes of the corrugated medium and a pressure roll for pressing a sheet linerboard against the corrugated medium after the adhesive has been applied to bond the linerboard to the corrugated medium.

24 Claims, 2 Drawing Figures

SINGLE FACER FOR MANUFACTURING SINGLE-FACED CORRUGATED BOARD

Matter enclosed in heavy brackets [ ] appears in the original patent but forms no part of this reissue specification; matter printed in italics indicates the additions made by reissue.

RELATED APPLICATION

This application is a continuation-in-part of my pending patent application Ser. No. 778,613 filed Mar. 17, 1977 entitled "SINGLE FACER FOR MANUFACTURING SINGLE-FACED CORRUGATED BOARD", now abandoned.

The present invention relates to a single facer for manufacturing single-faced corrugated board, and more particularly to such a single facer wherein a fed sheet medium is corrugated by means of deformation between a first and a second corrugating rolls meshing with each other, and transported along the peripheral surface of said second corrugating roll with adhesive being applied onto the peaks of the flutes of said corrugated medium during its transportation, and sheet linerboard is bonded, by means of a pressure roll, on said medium to which adhesive has been applied.

In manufacturing single-faced corrugated board by means of a single facer, means is required for preventing the disengagement of the medium from the second corrugating roll due to the elasticity of the medium and the centrifugal force caused through the rotation of the second corrugating roll, and for guiding the medium along the peripheral surface of the second corrugating roll. With the conventional single facer, medium guiding fingers were disposed along the periphery of the second corrugating roll from the engagement portion between the first corrugating roll and the second corrugating roll to the rotary contact portion between the second corrugating roll and the pressure roll. In order to accomodate the fingers, finger grooves were formed in the adhesive pickup-applicator roll of the adhesive applying means, corresponding to the respective fingers. As a result, no adhesive applying was performed on the peaks of the flutes of the corrugated medium corresponding to the fingers, and so-called finger lines responsible for the reduced strength of the corrugated board were formed. Also, due to the disposition of the fingers in the very narrow grooves, the adhesive was apt to attach to the fingers and build up. Thus, either an excessive amount of adhesive remained partly on the peaks of the flutes of the corrugated medium, or the buildup of adhesive wiped adhesive off the peaks of the flutes of the corrugated medium, resulting in the formation of the wider finger lines. In addition, in order to prevent the fingers from contacting the finger grooves, the fingers each were required to be inserted correctly into the respective finger grooves. The finger-resetting operation was very difficult be effected in setting up the fingers or the adhesive roll.

Further, it was difficult for the medium guiding fingers to cause the medium to completely contact the surface of the second corrugating roll, since the fingers were required not to interfere with transportation of the corrugated medium and not to harm the same.

Accordingly, the corrugated medium suffered from the pressure roll causing it again to contact the surface of the second corrugating roll, at the bonding location, if the corrugated medium disengaged from the surface at the adhesive applying location. It is difficult for the corrugated medium which has once disengaged from the second corrugating roll to come again into complete contact with the same. As a result, the above-mentioned pressure on the corrugated medium caused distortion of the flutes of the corrugated medium which would lower the strength of the finished corrugated board thus made. This defect [was remarkable] *occurred* particularly in case of highspeed bonding of linerboard with the corrugated medium. It is therefore an object of the present invention to provide a single facer for manufacturing single-faced corrugated board, wherein there is provided no conventional finger for guiding a corrugated medium, but the second corrugating roll is provided with apertures extending through the base of axially spaced circumferential grooves around the periphery of the roll for attracting the medium through a wide suction area onto the peripheral surface thereof such that the attracting action contributes to the corrugation of the medium as well as to the holding and transporting of the same along the periphery of the second corrugating roll, thereby [resulting in] preventing the occurrence of [no-] *voids in the* adhesive-applied portions on the medium, [superfluous] *the excessive* application of adhesive to the corrugated medium, and distortion of flutes on the same, and also resulting in enabling high-speed bonding of the linerboard to the corrugated medium.

Other objects, features and advantages of the invention will be readily apparent from the following description of certain preferred embodiment thereof, taken in conjunction with the accompanying drawings, in which.

Figure 2:
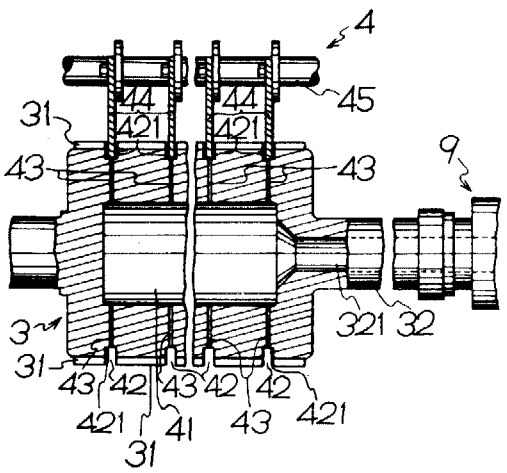
FIG. 2 is a sectional view of the single facer taken on the line X—X in FIG. 1, showing plates, which serve as guide means as well as seal means, and a second corrugating roll.
Figure 1:
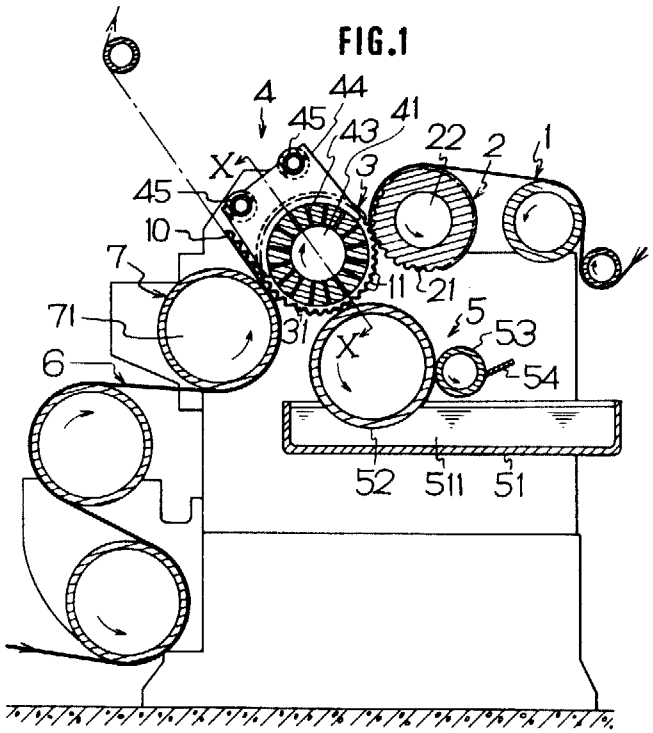
FIG. 1 is a schematic view showing a single facer according to this invention in transverse section.

Referring now to one embodiment of this invention shown in FIGS. 1 and 2, as apparent from FIG. 1, a single facer for manufacturing single-faced corrugated board 10 comprises a first corrugating roll 2 provided with flutes 21 and with a heating means; a second corrugating roll 3 having flutes *31* meshing with the flutes 21 of the first corrugating roll 2 to form a nip for receiving a sheet medium 1 to corrugate the same, said second corrugating roll 3 being provided with apertures in the form of radially extending conduits 43 in its periphery through which suction is applied for attracting and holding the corrugated medium 1 onto the peripheral surface thereof, but not provided with heating means; means 5 for applying adhesive to the peaks of the flutes of the corrugated medium 1; a pressure roll 7 having heating means for pressing a fed sheet linerboard 6 against the corrugated medium 1, after adhesive has been applied on the peaks of the flutes thereof and which is attracted onto the peripheral surface of the second corrugating roll 3, so as to bond the linerboard 6 onto the medium 1; and plates 44 serving as guide means 4 for detaching from the second corrugating roll 3 the corrugated medium 1 passing from between the second corrugating roll 3 and the pressure roll 7, as well as means for sealing all or a part of the apertures or conduits 43 over that part of the second corrugating roll 3 not lapped by the corrugated medium 1.

The first corrugating roll 2 and the second corrugating roll 3 mesh with each other and are driven by an appropriate driving means in directions opposite to each other.

The second corrugating roll 3 is movable axially pursuant to the known manner for preventing partial wear that may be caused [a] due to the meshing only at definite portions thereof of said roll 3 and the first corrugating roll 2. The heating means of the first corrugating roll 2 comprises, for example, a hollow portion 22 of said roll 2 having steam fully contained therein.

The apertures 43 of the second corrugating roll 3 are distributed [on] *circumferentially about* the bottom surfaces 421 of [the] *a plurality of axially spaced* circumferential grooves 42 [each] formed around the periphery of the second corrugating roll 3 and communicate *at their inner ends* with a hollow portion 41 of the second corrugating roll 3, the pressure within the hollow portion being maintained lower than that of the atmosphere. The apertures 43 are arranged in each groove bottom 421 [for] *with their outer ends below the bottoms of the flutes 31, thereby* obtaining uniform distribution of attracting force *or suction* on the peripheral surface of said roll 3. In the supporting shaft 32 of said roll 3 is formed a conduit 321 communicating with the hollow portion 41 of the roll 3 and which also communicates with [the] *any* well-known suction means (not shown) such as a vacuum pump or the like through the rotary joint 9.

The adhesive applying means 5 comprises; a pan 51 containing adhesive 511; a adhesive pickup-applicator roll 52 rotating in the direction opposite to that of the roll 3 and arranged so that its lower surface may be immersed into adhesive 511 and the upper surface be rotatably in contact with the peaks 11 of the flutes of the corrugated medium 1 which moves along the rotational direction of the roll 3; a doctor roll 53 to remove superfluous adhesive adhered to the roll 52; and a doctor 54 to scrape away adhesive on the roll [52] *53*. The rolls 52 and 53 are driven by an appropriate driving means (not illustrated).

The pressure roll 7 is driven in the direction opposite to that of the second corrugating roll 3 by a driving means not shown in the drawings and is capable of contacting rotatably under a fixed pressure with the second corrugating roll 3. The heating means of the pressure roll 7 comprises, for example, a hollow portion 71 of said roll 7 having steam fully contained therein, and exhibits a favorable effect in bonding the linerboard 6 to the corrugated medium 1.

The plates 44 serving as guide and seal means 4 are arranged above the second corrugating roll 3, the lower end of each plate 44 being cut away concavely in the form of an approximate semi-circle and being engaged within a groove 42 of the roll 3 so as to seal all or some of the apertures 43 in the groove over that part of said corrugating roll not lapped by the corrugated medium. Tips on the lower ends of plates 44 are situated between the rolls 3 and 7 so as to be capable of detaching the medium 1, which emerges from between rolls 3 and 7 together with the linerboard 6, from the roll 3. The upper portions of the plate 44 are tightly secured to the supporting rods 45 which are in parallel with the axis of the second corrugating roll 3, both ends of the supporting rods 45 being slidably supported so as to be able to move in the direction parallel with the roll 3 by the suitable members not illustrated herein.

A manufacturing process for single-faced corrugated board by means of the aforementioned single facer according to this invention is described hereunder.

The *advancing or* fed sheet medium 1 is nipped by the first and second rolls 2 and 3 [respectively] after having been guided by the first roll 2, and then is corrugated while being heated during passage between the corrugating rolls 2 and 3, while being strongly attracted onto the peripheral surface of the second corrugating roll 3 by the suction in apertures 43. The corrugated medium 1 is [moved to] *advanced* between the roll 3 and the pressure roll 7 as it is kept attracted and held tightly onto the periphery of the roll 3 without being detached therefrom. During the movement mentioned above, adhesive is applied [onto] *uniformly to* the peaks 11 of the flutes of the corrugated medium 1 by the adhesive pickup-applicator roll 52, thereby avoiding the [superfluous or non-application] *excessive application or mis-application* of adhesive to the corrugated medium. The fed linerboard 6 is pressed to said medium 1 by the pressure roll 7 without distorting the flutes of the corrugated medium which is tightly attracted onto the roll 3 *by the suction in the spaced apertures 43,* and thus, a single-faced corrugated board 10 is made up. The medium 1 of the corrugated board 10 that has emerged from between the rolls 3 and 7 is detached from the periphery of the roll 3 by the plates 44. To avoid partial wear of the first and second corrugating rolls 2 and 3 respectively, the second roll 3 is occasionally moved axially. When the roll 3 is moved axially, the plates 44 [are, as], being kept in engagement with the grooves 42 thereof, *are* moved with the roll 3, thereby the effect of the plates 44 is maintained.

*By locating the apertures or conduits 43 below the bottoms of the flutes 31, the outer ends of the conduits are spaced from the corrugated medium or sheet 1. Accordingly, the apertures 43 are not sealed nor closed by the sheet 1, but remain open at all times. Since the apertures 43 are not in contact with the corrugated sheet 1, the attracting force of the suction emanating from the plural conduits 43 is distributed uniformly over a wide area of the corrugated sheet. This enhances the force of the suction asserted on the corrugated sheet 1 to retain it securely on the periphery of the roll 3, without displacement and consequent distortion of its corrugations, as it is transported between rolls 2 and 7. The enhanced suction force contributes to the corrugation of the sheet 1 and to the uniform, void-free application of adhesive, and permits high speed bonding of the linerboard 6 to the corrugated medium. The arcuate gap formed between the corrugated sheet 1 on roll 3 and the outer ends of the plural apertures 43 in each of the grooves 42 also serves to reduce clogging or fouling of the apertures during operation of the single facer.*

Although a preferred embodiment of this invention has been shown and described for the purpose of illustration, as required by Title 35 U.S.C. 112, it is to be understood that various changes and modifications may be made thereto without departing from the spirit and utility of the invention, or the scope thereof as set forth in the appended claims. For example, while the members or plates 44 which provide both the sealing means for the suction conduits 43 and the guide means for stripping the finished board 10 from the second corrugating roll 53 have been illustrated as comprising a single means 4, the two means may be formed independently of each other. In such case, the separate guide means may comprise plates similar to members 44 and engage with circumferential grooves (not shown) disposed around the periphery of roll 3, similar to the suction grooves 42. In the event the sealing means and guide means are formed separately from each other, both such means preferably are supported slidably by a common support, such as rod 45, so as to be enabled to move, together with roll 3, along the axis of that roll. In some situations, it may be possible to eliminate the sealing means, or the guide means, or both. The sealing means provided by the members or plates 44 may be eliminated, for example, when the attracting force of the suction is particularly strong, rendering unnecessary the sealing of the suction conduits 43 on the open side of the lower corrugating roll 3.

I claim:

1. A single facer for manufacturing single-faced corrugated board comprising:

(a) a first corrugating roll;

(b) a hollow second corrugating roll meshing with said first corrugating roll to form a nip for receiving a sheet medium to corrugate the same;

(c) a source of suction connected to the hollow portion of the second corrugating roll to maintain pressure within the hollow portion below atmospheric pressure;

(d) plural axially spaced circumferential grooves disposed about the periphery of the second corrugating roll;

(e) plural suction conduits connecting the hollow portion of the second corrugating roll to at least some of the circumferential grooves, whereby suction attracts and holds the corrugated medium onto a portion of the peripheral surface of the second corrugating roll;

(f) sealing means having members engaging within the grooves to seal at least some of the conduits disposed in that portion of the second corrugating roll not lapped by the corrugated medium;

(g) means for applying adhesive to the peaks of the flutes of the corrugated medium; and (h) a pressure roll for pressing a sheet linerboard against the corrugated medium after the adjesive has been applied, to bond the linerboard to the corrugated medium.

2. A single facer as claimed in claim 1, wherein said sealing means serves as guide to strip from the second corrugating roll the corrugated medium passing between the second corrugating roll and the pressure roll.

3. A single facer as claimed in claim 1, further including guide means having members engaging within axially spaced circumferential grooves disposed around the periphery of said second corrugating roll to strip from said second corrugating roll the corrugated medium passing between the second corrugating roll and the pressure roll.

4. A single facer as claimed in claim 3, wherein said members of the guide means are engaged within grooves that have said suction conduits.

5. A single facer as claimed in claim 1, wherein the second corrugating roll and the sealing means are movable together in the axial direction of the second corrugating roll.

6. A single facer as claimed in claim 3, wherein the second corrugating roll, the sealing means and the guide means are movable together in the axial direction of the second corrugating roll.

7. A single facer for manufacturing single-faced corrugated board comprising:

(a) a first corrugating roll;

(b) a hollow second corrugating roll meshing with said first corrugating roll to form a nip for receiving a sheet medium to corrugate the same;

(c) a source of suction connected to the hollow portion of the second corrugating roll to maintain pressure within the hollow portion below atmospheric pressure;

(d) plural axially spaced circumferential grooves disposed about the periphery of the second corrugating roll;

(e) plural suction conduits connecting the hollow portion of the second corrugating roll to at least some of the circumferential grooves, whereby suction attracts and holds the corrugated medium onto a portion of the peripheral surface of the second corrugating roll;

(f) means for applying adhesive to the peaks of the flutes of the corrugated medium;

(g) a pressure roll for pressing a sheet linerboard against the corrugated medium after the adhesive has been applied, to bond the linerboard to the corrugated medium; and (h) guide means having members engaging within axially spaced circumferential grooves disposed around the periphery of said second corrugating roll to strip from said second corrugating roll the corrugated medium passing between the second corrugating roll and the pressure roll.

8. A single facer as claimed in claim 7, wherein said members of the guide means are engaged within grooves that have said suction conduits.

9. A single facer as claimed in claim 8, wherein the second corrugating roll and the guide means are movable together in the axial direction of the second corrugating roll.

10. A single facer as claimed in claim 8, wherein said guide means members serve as sealing means to seal at least some of the suction conduits disposed in that portion of the second corrugating roll not lapped by the corrugated medium.

11. A single facer as claimed in claim 7, further including sealing means having members engaging within grooves that have said suction conduits to seal at least some of the conduits disposed in that portion of the second corrugating roll not lapped by the corrugated medium.

12. A single facer as claimed in claim 11, wherein the second corrugating roll, the guide means and the sealing means are movable together in the axial direction of the second corrugating roll.

*13. A single facer for manufacturing single-faced corrugated board comprising:*

*(a) a first fluted corrugating roll;*

*(b) a second fluted corrugating roll meshing with said first corrugating roll to form a nip for receiving a sheet medium to corrugate the same;*

*(c) plural axially spaced circumferential grooves disposed about the periphery of the second corrugating roll, said grooves each having a bottom located below the bottoms of the flutes on the second roll;*

*(d) plural suction conduits formed in the periphery of the second corrugating roll to provide a suction force for attracting and holding the corrugated sheet medium onto a portion of the peripheral surface of the second corrugating roll, each said suction conduit having an inner end and an outer end, said outer suction conduit ends terminating at the bottoms of the grooves*

*whereby said outer ends are spaced from the corrugated medium on the second corrugating roll;*

*(e) a source of suction connected to the inner ends of the suction conduits;*

*(f) means for applying adhesive to the peaks of the flutes of the corrugated medium; and*

*(g) a pressure roll for pressing a sheet linerboard against the corrugated medium after the adhesive has been applied, to bond the linerboard to the corrugated medium.*

*14. A single facer as claimed in claim 13, wherein*

*(a) the second corrugating roll is provided with at least one hollow portion communicating with the inner ends of a plurality of suction conduits and*

*(b) conduit means connects the hollow portion to the source of suction to maintain pressure within the hollow portion below atmospheric pressure.*

*15. A single facer as claimed in claim 13, wherein*

*(a) the suction conduits are arranged radially relative to the second corrugating roll and*

*(b) a plurality of said radial suction conduits are spaced circumferentially along the bottom of each groove of a plurality of the axially spaced circumferential grooves to provide an arcuate gap in each of said grooves between the outer ends of the radially extending suction conduits and the corrugated medium on the second corrugating roll, whereby the suction force emanating from the suction conduits is distributed uniformly over a wide area of the corrugated sheet to hold the corrugated sheet tightly onto the periphery of the second corrugating roll.*

*16. A single spacer as claimed in claim 13, further including in each of the grooves an arcuate gap between the outer ends of the suction conduits located at the bottom of the groove and the corrugated medium on the second corrugating roll, whereby the suction conduits remain free of contact with the corrugated medium during operation of the single facer.*

*17. A single facer as claimed in claim 13, further including means having members engaging within axially spaced circumferential grooves disposed around the periphery of the second corrugating roll to strip the corrugated medium from said roll.*

*18. A single facer as claimed in claim 13, further including sealing means having members engaging within said grooves to seal at least some of the suction conduits disposed in the portion of the second corrugating roll not lapped by the corrugated medium.*

*19. A single facer as claimed in claim 18, wherein said sealing means serves as guide means to strip from the second corrugating roll the corrugated medium passing between the second corrugating roll and the pressure roll.*

*20. A single facer as claimed in claim 13, further including guide means having members engaging within axially spaced circumferential grooves disposed about the periphery of said second conrrugating roll to strip from said second roll the corrugated medium passing between said second corrugating roll and the pressure roll.*

*21. A single facer as claimed in claim 20, wherein said guide means members serve as sealing means to seal at least some of the suction conduits disposed in that portion of the second corrugating roll not lapped by the corrugating medium.*

*22. A fingerless single facer for manufacturing single-faced corrugated board comprising:*

*(a) a first fluted corrugating roll;*

*(b) a second fluted corrugating roll meshing with said first corrugating roll to form a nip for receiving a sheet medium to corrugate the same;*

*(c) plural axially spaced circumferential grooves disposed about the periphery of the second corrugating roll, said grooves each having a bottom located below the bottoms of the flutes on the second roll;*

*(d) plural suction conduits formed in the periphery of the second corrugating roll to provide a suction force for attracting and holding the corrugated sheet medium onto a portion of the peripheral surface of the second corrugating roll, each said suction conduit having an inner end and an outer end;*

*(e) said outer suction conduit ends terminating at the bottoms of at least some of the grooves whereby said outer ends are spaced from the corrugated medium on the second corrugating roll to provide an arcuate gap in each of said grooves between the outer ends of the suction conduits and the corrugated medium on the second corrugating roll, whereby a suction force emanating from the suction conduits is distributed uniformly over a wide area of the corrugated sheet to hold the corrugated sheet tightly onto the periphery of the second corrugating roll;*

*(f) a source of suction connected to the inner ends of the suction conduits;*

*(g) means for applying adhesive to the peaks of the flutes of the corrugated medium;*

*(h) a pressure roll for pressing a sheet linerboard against the corrugated medium after the adhesive has been applied, to bond the linerboard to the corrugated medium; and*

*(i) dual means comprising both sealing means and guide means, said dual means having members engaging within grooves that contain suction conduits to seal suction conduits in the portion of said second corrugating roll not lapped by the corrugated medium and having members to strip from the second corrugating roll the corrugated medium passing between the second corrugating roll and the pressure roll.*

*23. A fingerless single facer as claimed in claim 22, wherein*

*(a) the dual means is provided with sealing members to seal suction conduits and*

*(b) said sealing members also constitute stripping means for stripping the laminated corrugated medium and linerboard from the second corrugating roll.*

*24. A fingerless single facer as claimed in claim 22, wherein*

*(a) the dual means is provided with stripping members for stripping the laminated corrugated medium and linerboard from the second corrugating roll and*

*(b) said stripping members also constitute sealing means for sealing suction conduits.*

* * * * *